United States Patent [19]

Sato et al.

[11] 3,978,153

[45] Aug. 31, 1976

[54] POWDER COATING COMPOSITION

[75] Inventors: Mikio Sato, Fuji; Kazuo Toyomoto, Yokohama; Jyoji Ibata, Fuji; Kazuhiro Suzuoki, Fuji; Yoshio Matsumoto, Fuji; Shunji Matsuo, Fuji; Yashio Hayashi, Fuji; Bunzo Uda, Fuji, all of Japan

[73] Assignee: Asahi Kasei Kogyo Kabushiki Kaisha, Osaka, Japan

[22] Filed: June 17, 1975

[21] Appl. No.: 587,683

[30] Foreign Application Priority Data

June 18, 1974 Japan.................. 49-68704
July 23, 1974 Japan.................. 49-83795
Aug. 5, 1974 Japan.................. 49-88981

[52] U.S. Cl. ...................... 260/835; 260/47 EA; 260/830 R; 260/836
[51] Int. Cl.²......................... C08L 63/00
[58] Field of Search .............. 260/835, 47 EA, 836, 260/830 R

[56] References Cited

UNITED STATES PATENTS

| | | | |
|---|---|---|---|
| 3,367,992 | 2/1968 | Bearden | 260/836 |
| 3,758,634 | 9/1973 | Labana | 260/836 |
| 3,787,520 | 1/1974 | Labana | 260/836 |
| 3,857,905 | 12/1974 | Blackley | 260/835 |
| 3,880,946 | 4/1975 | Labana | 260/830 R |
| 3,919,346 | 11/1975 | Katsimbas | 260/835 |
| 3,925,507 | 12/1975 | Katsimbas | 260/835 |

FOREIGN PATENTS OR APPLICATIONS

| | | | |
|---|---|---|---|
| 2,347,680 | 4/1974 | Germany | |
| 1,381,262 | 12/1970 | United Kingdom | 260/835 |

*Primary Examiner*—Paul Lieberman
*Attorney, Agent, or Firm*—Armstrong, Nikaido & Wegner

[57] ABSTRACT

An acrylic powder resin coating composition having good handling characteristics and capable of providing a coating having a well-balanced combination of the reflection sharpness and other physical properties is provided. This coating composition is prepared by incorporating in an acrylic copolymer resin a compound containing in the molecule one phenolic hydroxyl group and one carboxyl group and further containing at least one ester linkage between the benzene nucleus to which the phenolic hydroxyl group is bonded and the carboxyl group, said compound having a melting point of 45° to 160°C. and a number average molecular weight of up to 10,000. Especially good results are obtained when a polyester resin having a melting point of 40° to 160°C. and a number average molecular weight of 1,000 to 10,000 is further incorporated in this powder coating composition.

7 Claims, No Drawings

POWDER COATING COMPOSITION

This invention relates to a thermosetting acrylic powder coating composition which has good handling characteristics and provides a coating having a well-balanced combination of practical physical properties and other characteristics such as reflection sharpness.

In the art of synthetic resin paints, powder resin paints free of volatile components such as solvents and water have recently been developed as pollution-free, energy-saving, resource-saving and labor-saving paints.

Epoxy resin powder paints have heretofore been practically used as such powder paints most generally. Because of poor weatherability, however, their application fields are limited. Thermosetting acrylic powder paints comprising an epoxy group-containing acrylic resin have now been developed in the art as powder paints overcoming the above defect.

Indeed, it is expected that these thermosetting acrylic powder paints show excellent weatherability, good gloss, good flow characteristics and are excellent in other practical properties because of inherent characteristics of acrylic resins. However, it is very difficult to attain in these powder paints a well-balanced combination of handling characteristics and practical physical porperties and other properties of resulting coatings such as reflection sharpeness. Accordingly, they have not been practically used on an industrial scale.

For example, powder paints comprising a glycidyl group-containing acrylic resin and a polybasic carboxylic acid (see Japanese Patent Publication No. 38617/73, Japanese Patent Application Laid-Open Specification No. 26439/72 and Japanese Patent Application Laid-Open Specification No. 29836/73) corresponding to U.S. Pat. No. 3,752,870 generate large quantities of gases composed mainly of the polybasic carboxylic acid at the baking step, and powder paints of this type, therefore, are fatally dfective in that one of important objects of powder paints, namely prevention of occurrence of environmental pollution, cannot be attained. Still further, when these powder paints are used, it is very difficult to obtain coatings having practically satisfactory physical properties and good reflection sharpness in combination.

Further, there are known powder paints comprising a glycidyl group-containing acrylic resin and a carboxyl group-containing resin [see Japanese Patent Application Laid-Open Specifications Nos. 29838/73 (corresponding to U.S. Pat. Nos. 3,781,380) and 41443/74]. In these resins, however, a compatibility between the two resin components is very poor, and it is very difficult to obtain practically applicable coatings having good gloss and reflection sharpness.

Still further, there are known powder paints comprising a glycidyl group-containing acrylic resin and a diphenyl compound (see Japanese Patent Application Laid-Open Specification No. 28550/73 corresponding to U.S. Pat. No. 3,758,634) and powder paints comprising a glycidyl group-containing acrylic resin and a phenolic hydroxyl group-containing resin (see Japanese Patent Application Laid-Open Specification No. 28548/73 corresponding to U.S. Pat. No. 3,787,520). When these powder paints are employed, in order to obtain coatings having practically satisfactory physical properties, a high temperature and a long time are required at the baking step. Accordingly, the object of saving an energy cannot be attained in these powder paints, and they are fatally defective in this point. Moreover, extreme yellowing is caused in the coating at the baking step.

Still in addition, powder paints comprising a glycidyl group-containing resin and a diphenolic acid (see Japanese Patent Application Laid-Open Specification No. 50046/74) are known in the art. However, coagulation of paint particles is readily caused in these powder paints during storage, and this tendency is especially conspicuous under high temperature and high humidity conditions. Therefore, these powder paints are insufficient in handling characteristics.

Furthermore, there are known powder paints comprising a methylglycidyl group-containing acrylic resin and hydroxybenzoic acid (see French Patent No. 2,200,302). When ortho-hydroxybenzoic acid is used, yellowing and volatilization of ortho-hydroxybenzoic acid are conspicuous at the baking step. When meta- or para-hydroxybenzoic acid is employed, because of a high melting point of the hydroxybenzoic acid (meta-isomer = 208°C.; para-isomer = 213°C.), at the paint-preparing step it is impossible to disperse the hydroxybenzoic acid uniformly in the acrylic resin by melt-kneading both the components under such temperature conditions as will not cause substantial reaction between epoxy groups in the acrylic resin and the hydroxybenzoic acid. Further, it is impossible to obtain coatings excellent in reflection sharpness from these powder paints. Moreover, since the hydroxybenzoic acid used as the cross-linking component has a rigid molecular structure, the resulting coatings lack the flexibility and hence, physical properties of the coatings depend greatly on the thickness. Accordingly, when a high corrosion resistance is required and these powder paints should be coated in large thickness, the physical properties of the resulting coatings are drastically lowered. In short, because of these various defects, thermosetting acrylic powder paints containing hydroxybenzoic acid as a curing agent can hardly be put into practical use.

As a reuslt of our research works made with a view to developing powder. coating compositions which can overcome the foregoing defects and disadvantages involved in the conventional thermosetting acrylic powder paints including an epoxy group-containing acrylic resin and which has a well-balanced combination of various properties and characteristics of both the paints and resulting coatings, we have now arrived at this invention.

More specifically, in accordance with this invention, there is provided a powder coating composition which comprises (A) 100 parts by weight of a copolymer obtained by copolymerizing 5 to 30 % by weight of a compound represented by the following general formula

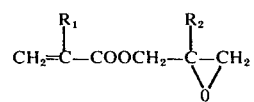

wherein $R_1$ and $R_2$ stand for a hydrogen atom or a methyl group,
with 95 to 70 % by weight of a vinyl compound other than said compound, said copolymer having a glass transition point of 30° to 90°C. and a weight average molecular weight of 2,500 to 30,000, and (B) 3 to 70 parts by weight of a compound containing in the molecule one phenolic hydroxy group and one carboxyl group and further containing at least one ester linkge between the benzene nucleus to which said phenolic hydroxyl group is bonded and said carboxyl group, said compound (B) having a melting point of 45° to 160°C. and a number average molecular weight of up to 10,000. In the compound (B) the ester linkage may be bonded to the benzene nucleus directly thereto or through an alkylene or arylene group having 1 to 10 carbon atoms.

The compound to be used as the component (B) in the powder coating composition of this invention has in the molecule at least one ester linkage. Accordingly, it has a good compatibility with the copolymer component (A). Further, it has a suitable melting point. Therefore, while a powder paint is prepared by melt-kneading both the components (A) and (B), no cross-linking reaction is caused to occur between the epoxy group of the copolymer (A) and the compound (B) and the compound (B) can easily be dispersed uniformly and completely in the copolymer component (A). By virtue of these characteristics, the composition of this invention can provide a coating excellent in reflection sharpness by coating and baking.

Further, since the compound (B) contains soft linked segments between the phenolic hydroxyl group and carboxyl group, the compound (B) acting as a curing agent (a cross linking molecule) for the copolymer component (A) gives a good flexibility to the resulting coating after the baking treatment.

In addition to the foregoing characteristics, the powder coating composition of this invention has excellent properties. For example, the composition has no tendency for the paint particles to coagulate even under high temperature and high humidity storage conditions. Since the compound (B) has a relatively high molecular weight and it is uniformly dispersed in the copolymer component (A), the amount of a harmful gas generated at the baking step can be much reduced. Thus, the powder coating composition of this invention has very excellent characteristics.

In short, the powder coating composition of this invention has surprising effects not expected from the above-mentioned conventional powder paint containing hydroxybenzoic acid as a curing agent in the point that a coating excellent in physical properties such as flexibility and reflection sharpness can be provided by the powder coating composition of this invention.

It is also a surprising fact that the powder coating composition has a well-balanced combination of physical properties and reflection sharpness in the resulting coating. Such powder coating composition is quite surprising in view of the status of the art and it is substantially impossible to proide such powder coating composition according to the convention techniques, as is described below.

Formation of coatings and baking of powder paints is generally conducted according to the following process.

A powder paint is applied onto an article to be coated, and then the article is placed in a baking furnace where the temperature of the powder paint and the article is gradually elevated to a prescribed baking temperature, during which the powder paint is molten and rendered flowable. while the coating film is thus formed, cros-linking reaction proceeds between the resin and the curing agent. In general, the physical properties of the resulting coating are influenced not only by the molecular structures of the resin and curing agent but also by the final deree of cross-linking attained by baking. More specifically, if the degree of cross-linking is low, physical properties are inferior to those of a coating having a higher degree of cross-linking. The reflection sharpness, which is influenced by both the gloss and smoothness of the coating, varies greatly depending on not only the compatibility between the resin and curing agent and the dispersion state of the curing agent in the resin component but also the flow behavior of the powder paint at the baking step. More specifically, when the flowability of the powder paint is insufficient, the reflection sharpness of the resulting coating is lower than that of a coating prepared from a powder paint having a better flowability.

Accordingly, at the baking step it is required to perform the cross-linking reaction promptly in the powder paint to attain a sufficient degree of cross-linking and to render the powder paint completely flowable in a short time. In practice, however, it is very difficult to satisfy both the requirements at the same time.

In general, good physical properties of coatings are attained by increasing the molecular weight of the resin component or the concentration or amount of functional groups participating in the cross-linking reaction, more specifically using a resin having a high epoxy group content, and by increasing the amount used of the curing agent. However, if a resin having a high molecular weight or a high concentration of functional groups participating in the cross-linking reaction is employed, at the baking step the cross-linking reaction proceeds so promptly that it is completed before the powder paint is completely molten and rendered flowable and forms a smooth coating film. For this reason, in this case, the flow characteristics of the powder paint are insufficient as compared with the case where a resin having a low molecular weight or a low functional group concentration is employed, and accordingly, the reflection sharpness of the resulting coating is very low.

In order to improve the reflection sharpness in the resulting coating, therefore, it is necessary to use a resin having a low molecular weight or a low functional group content, but in this case, physical properties of the resulting coating are much degraded.

In short, the improvement of the reflection sharpness in the resulting coating and the improvement of physical properties thereof are generally incompatible with each other, and therefore, according to the conventional techniques it is very difficult to obtain a powder paint having a well-balanced combination of properties.

Especially when a curing agent having in the molecule at least two same functional groups capable of reacting with epoxy groups of the resin component, for example, a curing agent containing two carboxyl groups, a curing agent containing two phenolic hydroxyl groups, a curing agent containing one carboxyl group and two phenolic hydroxy groups, or the like is employed, during the stage where the melt flowing and the cross-linking reaction proceed competitively in the powder paint at the baking step, two same functional groups in the curing agent react with two epoxy groups of the different polymer chains at the very primary stage of the cross-linking reaction and the melt viscosity of the powder paint increases abruptly before it is sufficiently molten and rendered flowable. Accordingly, satisfactory flowability can hardly be obtained. In short, when curing agents as mentioned above are employed, it is very difficult to attain a well-balanced combination of physical properties and reflection sharpness in the resulting coatings.

Further, when thermosetting powder paints are employed, in order to attain energy-saving and resource-saving effects, it is necessary to conduct baking at a lower temperature and complete it in a shorter time. In such case, however, since the temperature initiating the cross-linking reaction in the powder paint is much lowered and it approximates the melt flow-initiating temperature of the powder paint, it becomes more difficult to attain a good balance between physical properties and reflection sharpness in the resulting coating.

When a curing agent containing in the molecule one phenolic phydroxyl group and one carboxyl group is used according to this invention, the foregoing disadvantages can be overcome. Illustratively stated, this invention is based on the finding that when a specific compound (B) as specified in this invention is used as the curing agent, there can be attained a surprising effect that the above-mentioned various defects involved in conventional curing agents can be overcome and a coating excellent not only in physical properties but also in reflection sharpness can be obtained.

It is construed that this unexpected effect attained by the use of the curing agent of this invention is owing to the following chemical mechanism.

The phenolic hydroxyl group of the compound (B) in the powder coating composition of this invention has a little lower reactivity with the epoxy group of the copolymer component (A) than that of the other functional group of the compound (B), namely the carboxyl group, and as a result, the reactivity of the compound (B) as a whole is appropriately controlled. Moreover, since at least one ester linkage is present between these phenolic hydroxyl and carboxyl groups, an appropriate softness is given and the compatibility with the acrylic resin, especially the compatibility under heating, is extremely improved. Accordingly, during the stage where the melt flowing and the cross-linking reaction proceed competitively at the baking step, the flowability of the powder paint is not degraded at all. More specifically, the carboxyl group reacts preferentially with the epoxy group and then, the phenolic hydroxyl group reacts with the epoxy group when the powder paint is rendered sufficiently flowable. Consequently, the degree of reaction is sufficiently increased in the epoxy group of the resin component and a satisfactory flow condition can be attained in the powder paint.

The components (A) and (B) constituting the powder coating composition of this invention will now be described in detail.

As pointed out hereinabove, the copolymer component (A) of the powder coating composition of this invention is one obtained by copolymerizing a compound represented by the following general formula

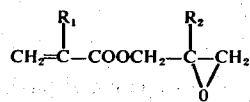

wherein $R_1$ and $R_2$ stand for a hydrogen atom or a methyl group,
with a vinyl monomer other than said compound.

As the monomer represented by the above general formula, there can be mentioned, for example, glycidyl acrylate, glycidyl methacrylate, β-methylglycidyl and β-methylglycidyl methacrylate.

The amount used of the monomer represented by the above general formula is 5 to 30 % by weight, preferably 10 to 25 % by weight, based on the total copolymer (A). When the amount used of this monomer is less than 5 % by weight, no sufficient cross-linking can be attained and the resulting coating is insufficient in the solvent resistance and the metal adhesion. If the amount of the above monomer exceeds 30% by weight, in many cases a good appearance is not attained in the resulting coating, and sufficient elongation and toughness cannot be obtained.

As the vinyl monomer to be used as the other component of the copolymer (A), which is copolymerizable with the above monomer, there can be mentioned, for example, acrylic acid esters such as methyl acrylate, ethyl acrylate, n-butyl acrylate, isobutyl acrylate and 2-ethylhexyl acrylate, methacrylic acid esters such as methyl methacrylate, ethyl methacrylate, n-butyl methacrylate, isobutyl methacrylate, 2-ethylhexyl methacrylate, lauryl methacrylate and tridecyl methacrylate, alkenyl aromatic monomers such as styrene, vinyltoluene and α-methylstyrene, and methacrylonitrile, acrylonitrile and the like.

In order to obtain a coating having good boiling water resistance, good alkali resistance and well-balanced physical properties, it is preferred that in the composition of this invention, styrene be used in an amount of at least 20% by weight based on the copolymer (A) as one monomer component constituting the copolymer component (A).

The weight average molecular weight of the copolymer (A) is 2,500 to 30,000, preferably 4,000 to 15,000, and the glass transition temperature is 30° to 90°C., preferably 35° to 60°C.

In case the weight average molecular weight or the glass transition point is outside the above-mentioned range, a powder point having excellent properties as intended in this invention cannot be obtained.

The copolymer (A) can be prepared by various copolymerization methods. In general, a free radical initiator should be used for inducing the polymerization reaction. A variety of free radical initiators having such activity are known in the art. For example, there can be mentioned benzoyl peroxide, lauroyl peroxide, t-butyl hydroperoxide, acetylcyclohexanesulfonyl peroxide, isobutyroyl peroxide, di-(2-ethylhexyl) peroxydicarboxylate, di-isopropyl peroxydicarbonate, t-butyl peroxypivalate, decanoyl peroxide, azobis(2-methylpropionitrile) and the like. It is preferred that the copolymerization be carried out in a solvent capable of dissolving therein the resulting copolymer according to the solution polymerization technique. Toluene, benzene, xylens, dioxane, butanone (methylethylketone) and the like are preferred as such solvent. Removal of the solvent from the reaction mixture can be accomplished by vacuum drying or spray drying. Further, the resulting copolymer can be recovered by pouring a non-solvent such as hexane, octane, water or the like into the reaction mixture under agitation under suitable conditions to thereby precipitate the resulting copolymer. The so recovered copolymer may be dried to reduce the volatile substance content below 3%.

The copolymer (A) may also be formed according to the emulsion polymerization method, the suspension polymerization method or the bulk polymerization method or by adopting two or more of these polymerization methods in combination. In this case, it is sometines necessary to use a chain transfer agent so as to control the molecular weight of the resulting copolymer within a desired range.

The compound (B) which is incorporated into the above copolymer (A) to form a powder coating composition includes various types, which will now be described.

1. Compounds represented by the following general formula:

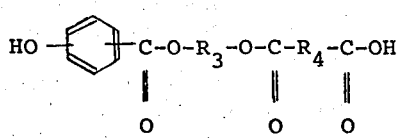

wherein $R_3$ stands for an alkylene, polyoxyalkylene or cycloalkylene group having 2 to 10 carbon atoms and $R_4$ stands for an arylene, alkylene or cycloalkylene group having 2 to 10 carbon atoms.

Compounds of this type are especially preferred as the compound (B), and they are derived from a hydroxybenzoic acid, a diol and an acid anhydride corresponding to the structural units linked together through the two ester linkages in the above general formula.

As specific examples of the hydroxybenzoic acid, there can be mentioned p-hydroxybenzoic acid, m-hydroxybenzoic acid and salicylic acid. As the diol corresponding to $R_3$, there can be mentioned, for example, ethylene glycol, propylene glycol, 1,3-propane diol, 1,3-butane diol, 1,4-butane diol, 1,5-pentane diol, hexamethylene diol, decamethylene diol, neopentyl glycol, hydrogenated bisphenol A, diethylene glycol, dipropylene glycol and tetramethylene glycol. As the acid anhydride corresponding to $R_4$, there can be mentioned, for example, phthalic anhydride, succinic anhydride, maleic anhydride, himic anhydride (3,6-endo-methylene-tetrahydrophthalic anhydride), tetrahydrophthalic anhydride, hexahydrophthalic anhydride, methyltetrahydrophthalic anhydride and the like.

Compounds of the type (1) can be obtained by linking the foregoing structural units in succession. For example, there can be adopted a method comprising reacting hydroxybenzoic acid with an excess of a diol to effect dehydration and link both the reactants, removing the unreacted diol and adding an acid anhydride to the reaction mixture to effect a further reaction, and a method comprising reacting a mono-ester of hydroxybenzolic acid with a lower alcohol such as methanol or ethanol, with an excess of a diol to effect ester exchange, removing the unreacted diol and adding an acid anhydride to the ester-exchange reaction mixture to effect a further reaction.

As examples of the compound of the type (1), the following compounds can be mentioned:

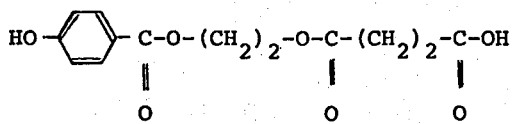

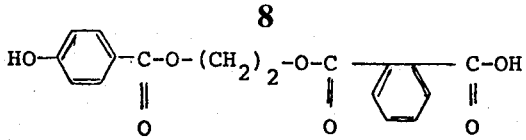

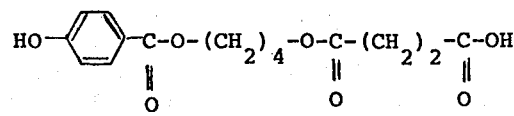

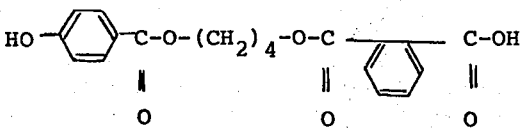

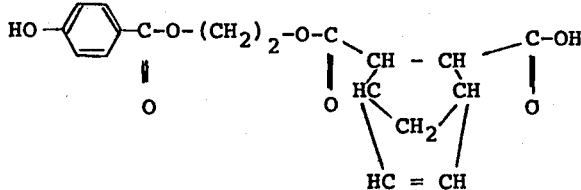

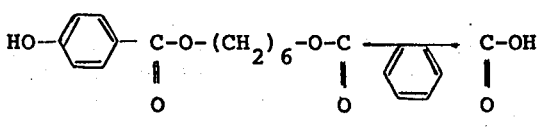

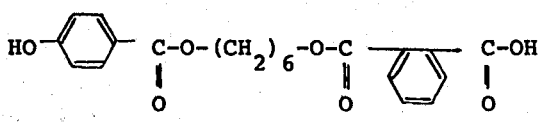

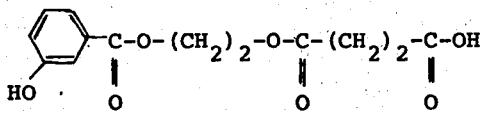

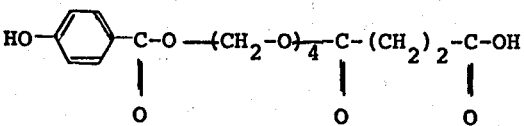

2. Compounds represented by the following general formula:

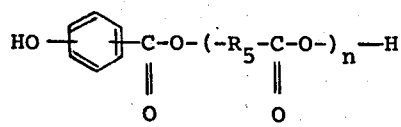

wherein $R_5$ stands for an alkylene group having 1 to 20 carbon atoms and $n$ is an integer of at least 1.

Compounds of this type are prepared by the addition reaction between ortho-, meta- or para-hydroxybenzoic acid, preferably para-hydroxybenzoic acid, and a lactone represented by the following general formula:

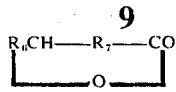

wherein $R_6$ stands for an alkyl or aryl group having 1 to 6 carbon atoms and $R_7$ stands for an alkylene group having 1 to 14 carbon atoms.

As the lactone, there are preferably employed β-propiolactone, β-butyrolactone, ε-caprolactone, δ-valerolactone, pivalolactone, 4-methylisopropyl-ε-caprolactone and the like. Use of ε-caprolactone is especially preferred.

In general, the lactone is used in an amount of at least 1 mole per mole of the hydroxybenzoic acid, and a preferred amount used of the lactone is 1 to 10 moles per mole of the hydroxybenzoic acid.

It is preferred that the molecular weight of the above hydroxybenzoic acid-lactone adduct be within a range of from 210 to 1,000.

In this invention, a mixture of two or more of compounds represented by the above general formula can be used as the compound (B). It is also possible to use an adduct formed by adding two or more of different lactones to hydroxybenzoic acid.

In case such mixture is employed, the molecular weight of the compound (B) mentioned in this invention is an average molecular weight of the mixture, and even though a compound having a molecular weight not included in the range specified in this invention is contained in the mixture, so far as the average molecular weight of the mixture as a whole is within the range specified in this invention, the mixture is included in the compound (B) specified in this invention. Further, the above adduct may contain a small amount of hydroxybenzoic acid.

The compound of the type (2) to be used as the compound (B) in the composition of this invention can be prepared by optional methods. For example, the compound of the type (2) can be synthesized by heating a mixture of hydroxybenzoic acid and a lactone represented by the above formula at 100° to 200°C. in a water-free state in the presence or absence of an organic tin compound or other catalyst and removing the unreacted lactone from the reaction mixture. As the compound of the type (2), there can also be mentioned an esterification product derived from hydroxybenzoic acid and hydroxystearic acid.

3. Compounds represented by the following general formula:

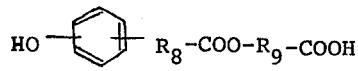

wherein $R_8$ stands for an alkylene or arylene group having 1 to 10 carbon atoms and $R_9$ stands for an alkylene, arylene or cycloalkylene group having 1 to 20 carbon atoms.

Compounds of this type can be synthesized by esterfication between a phenoxycarboxylic acid and a hydroxycarboxylic acid. As a specific example of the compound of this type, there can be mentioned an esterification product derived from 3-(p-hydroxyphenyl)-propionic acid and hydroxystearic acid.

4. Polyester resins having one phenolic hydroxyl group and one carboxyl group at terminal ends thereof.

Such polyester resin to be used as the compound (B) in this invention can be prepared, for example, according to a method comprising subjecting a polybaric carboxylic acid, a saturated aliphatic polyhydric alcohol and a compound having a phenolic hydroxyl group and a carboxylic group or an alcoholic hydroxyl group to an ester exchange reaction or dehydration condensation reaction to form a polyester having one phenolic hydroxyl group and one alcoholic hydroxyl group at terminal ends thereof and adding an acid anhydride to the polyester to react it with the terminal alcoholic hydroxyl group of the polyester, or a method comprising subjecting a polybasic carboxylic acid, a saturated aliphatic polyhydric alcohol and a compound having a phenolic hydroxyl group and a carboxylic group or an alcoholic hydroxyl group to an ester exchange reaction or dehydration condensation reaction to form a polyester having phenolic hydroxyl groups at both the terminal ends therof and adding a dicarboxylic acid in an amount equivalent to the amount of the phenolic hydroxyl groups to effect acid decomposition of the polyester.

As the polybasic carboxylic acid, there can be mentioned, for example, phthalic anhydride, isophthalic acid, terephthalic acid, maleic acid, fumaric acid, tetrahydrophthalic acid, hexahydrophthalic acid, succinic acid, adipic acid, suberic acid, pimelic acid, azelaic acid, sebacic acid, 1,10-decanedicarboxylic acid, trimellitic anhydride and ester-forming derivatives of these acids. In order to obtain coatings excellent in such properties as weatherability, it is preferred that saturated aliphatic dicarboxylic acids such as succinic acid, adipic acid and sebacic acid and aromatic dicarboxylic acids such as isophthalic acid, phthalic anhydride and terephthalic acid be used as the polybasic carboxylic acid.

As the saturated aliphatic polyhydric alcohol, there are employed, for example, ethylene glycol, propylene glycol, 1,4-butane diol, 1,5-pentane diol, 1,6-hexane diol, neopentyl glycol, trimethylol propane, glycerin pentaerythritol and hydrogenated bisphenol A.

As the compound having a phenolic hydroxyl group and a carboxylic group or an alcoholic hydroxyl group, there can be mentioned, for example, compounds containing both a phenolic hydroxyl group and a carboxyl group or its ester-forming derivative, such as salicylic acid, meta-hyroxybenzoic acid, para-hydroxybenzoic acid, 2-hydroxy-3-naphthoic acid, p-hydroxyphenylacetic acid, 3-(p-hydroxyphenyl)-propionic acid, 3-(p-hydroxybenzoyl)-propionic acid and m-hydroxyphenylacetic acid, and compounds containing both a phenolic hydroxyl group and an alcoholic hydroxyl group, such as o-hydroxybenzyl alcohol, p-hydroxybenzyl alcohol and alkyl esters thereof.

As the acid anhydride to be reacted with the terminal alcoholic group, there can be mentioned, for example, phthalic anhydride, tetrahydrophthalic anhydride, hexahydrophthalic anhydride, succinic anhydride, maleic anhydride and himic anhydride.

In order to attain the intended objects of this invention, it is indispensable that the compound (B) should have a melting point of 45 to 160°C. When the melting point of the compound (B) is lower than 45°C., coagulation is readily caused in particles of the powder coating composition, and when the melting point is high than 160°C., it is difficult to disperse the compound (B) uniformly in the acrylic resin (A) at the powder paint-preparing step.

In this invention, it is also indispensable that the molecular weight of the compound (B) should be up to 10,000. If the molecular weight is higher that 10,000, the melt viscosity of the compound (B) is too high and a coating excellent in smoothness can hardly be obtained. In general, there may preferably be employed the compound (B) having a molecular weight of 1,000 to 10,000.

The compound (B) is incorporated in an amount of 3 to 70 parts by weight, preferably 5 to 50 parts by weight, into 100 parts by weight of the copolymer (A). When the amount of the compound (B) is smaller than 3 parts by weight per 100 parts by weight of the copolymer (A), the degree of cross-linking is insufficient in the final coating, and when the amount of the compound (B) is larger than 70 parts by weight, excellent coating characteristics inherent of acrylic resins are often degraded.

If desired, it is possible to incorporate in the powder coating composition of this invention a secondary cross-linking compound (C) having a good compatibility with the compound (B) which is used as a primary cross-linking agent and having a molecular weight of 130 to 500 in an amount of 3 to 40 parts by weight per 100 parts by weight of the copolymer component (A). This secondary cross-linking compound (C) is at least one member selected from the group consisting of (i) polybasic carboxylic acids, (ii) polyhydric phenols and (iii) compounds having in the molecule at least one phenolic hydroxyl group and at least one carboxyl group, other than the compound (B).

A powder coating composition containing the compound (C) in combination with the compound (B) is advantageous over a powder coating composition containing the compound (C) alone as the cross-linking component in the following points.

Since the compound (B) has a very good compatibility with the compound (C), the dispersibility of the compound (C) is improved and it can be uniformly dispersed in the acrylic resin together with the compound (B). Further, when the compound (C) is used in combination with the compound (B), a coating having an especially high reflection sharpness can be obtained. These effects are especially conspicuous when the above-mentioned polyester resin having one phenolic hydroxyl group and one carboxyl group is used as the compound (B).

As the polybasic acid (i) to be used as the secondary cross-linking compound (C), there can be mentioned, for example, isophthalic acid, terephthalic acid, hexahydrophthalic acid, adipic acid, suberic acid, pimeric acid, azelaic acid, sebacic acid, 1,10-decane-dicarboxylic acid, 1,12-dodecane-dicarboxylic acid, maleic acid, fumaric acid, itaconic acid, tetrahydrophthalic acid, and anhydrides of these acids.

As the polyhydric phenol (ii), there can be used, for example, bisphenol A, dihydroxydiphenylsulfone, 1,1'-bis(4-hydroxyphenyl)-cyclohexane, 4,4'-diphenol and the like.

As the compound (iii) having in the molecule at least one phenolic hydroxyl group and at least one carboxyl group, there can be employed, for example, salicyclic acid, metahydroxybenzoic acid, para-hydroxybenzoic acid, 3-(p-hydroxybenzoyl)-propionic acid, 3-(p-hydroxyphenyl)-propionic acid, 3,5-dihydroxybenzoic acid, 2,4-dihydroxybenzoic acid, 5,5'-methylene-disalicylic acid and the like.

In this invention, it is especially preferred that a polyester resin (D) other than the compound (B), which has a good compatibility with the compound (B), a number average molecular weight of 1,000 to 10,000 and a melting point of 40° to 160°C. be incorporated as an additive into the powder coating composition of this invention in an amount of 5 to 40 parts by weight per 100 parts by weight of the copolymer (A).

Such polyester resin can be obtained by subjecting a polybasic carboxylic acid and a saturated aliphatic polyhydric alcohol as the main components to a dehydration condensation reaction.

As the polybasic carboxylic acid, there can be used, for example, phthalic anhydride, isophthalic acid, terephthalic acid, maleic acid, fumaric acid, tetrahydrophthalic acid, hexahydrophthalic acid, succinic acid, adipic acid, suberic acid, pimeric acid, azelaic acid, sebacic acid, 1,10-decandicarboxylic acid, trimellitic anhydride and the like. In view of the weatherability and other properties of the resulting coating, it is preferred to use, as the polybasic carboxylic acid, saturated aliphatic dicarboxylic acids such as succinic acid, adipic acid and sebacic acid and aromatic dicarboxylic acids such as isophthalic acid, phthalic anhydride and terephthalic acid.

As the saturated aliphatic polyhydric alcohol, there can be used, for example, ethylene glycol, propylene glycol, 1,4-butane diol, 1,5-pentane diol 1,6-hexane diol, neopentyl glycol, trimethylol propane, glycerin, pentaerythritol and hydrogenated bisphenol A.

Further, lactone polymers are preferably employed as such polyester resin. For example, lactone polymers derived from β-propiolactone, β-butyrolactone, ε-caprolactone, δ-valerolactone, pivalolactone and alkyl derivatives thereof (for example, 4-methylisopropyl-ε-caprolactone) can be used.

β-propiolactone and ε-caprolactone are preferably employed for production of the above lactone polymer as the polyester resin.

In case a polyester resin (D) such as mentioned above is incorporated in the powder coating composition of this invention of this invention, the reflection sharpness and softness are highly improved in the resulting coating. Illustratively stated, incorporation of the polyester resin (D) serves the cross-linking agent to be well dispersed, thereby to form a coating film having a good flexibility.

The composition of this invention may be used in the form of a clear paint, but in general, it is used after such additives as a pigment, a sagging-preventive agent, a surface-adjusting agent and a ultraviolet absorber have been incorporated according to suitable methods. If desired, a plasticizer such as an adipic acid ester, a phosphoric acid ester, a phthalic acid ester, a sebacic acid ester, a polyester derived from adipic acid or azelaic acid and an epoxy type plasticizer and an epoxy, novolak or ester type resin may be further incorporated in the powder coating composition of this invention.

The mixing of the cross-linking compound (B) and additive such as a pigment with the copolymer (A) is accomplished by the following methods.

When the copolymer (A) is prepared according to the solution polymerization technique, the mixing is performed by the solution mixing method, and the resulting mixture is granulated and pulverized according to customary procedures. In case the copolymer (A) is recovered as a solid, there can be adopted a dry blending method in which the mixing is performed in the solvent-free state by using a Henschel mixer, a ball mill or the like, or a melt blending method in which all the components are kneaded in the molten state under heating and high shearing and the kneaded mixture is pulverized again.

When the copolymer (A) has a relatively high glass transition point, it is preferred that the mixing be accomplished by a method in which all the components are mixed in the solution state by using a volatile solvent capable of easily dissolving both the copolymer (A) and the compound (B), the solvent is removed from the mixture and the residue is pulverized.

In order to enhance the effects of this invention, it is preferred to incorporate a promoter capable of promoting the reaction between epoxy groups of the copolymer (A) and functional groups of the compound (B) according to need. As such promotor, there can be employed, for example, tertiary amines, imidazoles, quaternary ammonium salts, $BF_3$ complexes and metal salts of salicylic acid and the like.

This promotor can be added mechanically or in the solution state when the copolymer (A) is blended with the compound (B) and other additives, and the addition can be conducted at an optional stage of this blending operation prior to completion of the blending operation.

The coating composition of this invention can be coated to an article according to a customary coating method, for example, an electrostatic spray coating method, and it is then baked in a heating furnace maintained at 140° to 200°C. for 10 to 60 minutes.

This invention will now be described in detail by reference to the following Examples that by no means limit the scope of this invention.

Properties mentioned in the Examples were measured and evaluated according to the following method.

1. Film Thickness:

A magnetic film thickness gauge was used, and the film thickness was determined from the difference of the magnetic force.

2. Gloss:

The film gloss was measured at an incident angle of 60° by a gloss meter by using as a standard plate a black plate (No. 74 B 150 manufactured by Suga Shikenki Kabushiki Kaisha, Japan).

3. Smoothness:

The smoothness was evaluated by a naked eye observation on the following rating:
good: orange peels were hardly observed.
slightly bad: orange peels were definitely observed.
bad: formation of orange peels was conspicuous.

4. Reflection Sharpness:

A card board having a width of 5 cm and a length of 50 cm, on which a striped pattern of alternately arranged black and white stripes of a width of 2 mm was formed by coating, was placed horizontally, and a coated panel was erected on one end of the card board rectangularly thereto. Eyes were fixed at a position 30 cm distant horizontally from the coated panel on the card board and 30 cm distant vertically upwardly from the surface of the card board. From this point the black-white pattern reflected on the panel was seen, and the heighest point where the black-white pattern relected on the panel could be definitely discriminated was determined and the distance from the panel-erected end to the above critical point was measured.

The reflection sharpness determined by this method is influenced by the gloss and smoothness of the film.

5. Storage Stability:

The powder paint was allowed to stand still at 35°C. for 48 hours, and the coagulation state of the paint particles was examined with the naked eye. The storage stability was evaluated on the following rating:
good: no substantial coagulation of the paint particles was observed and a good flowability was retained.
bad: coagulation of the paint particles was definitely observed and re-pulverization was necessary for restoring the flowability.

6. Volatility (weight loss by volatilization):

The powder paint was allowed to stand still at 190°C. for 30 minutes in a Petri dish, and the weight loss by volatilization was determined. The smell of the volatilized gas was examined.

7. Erichsen Value:

A punch having a diameter of 20 mm was pushed out from the back side of a coated panel and the distance (mm) of the push-out distance causing cracks and peels on the coated film was measured.

8. Du Pont Impace Value:

A coated panel was placed, with the coated face being positioned upside, between a weight of 500 g having a round top end of a diameter of 0.5 inch and a receiving stand having a recess of a configuration in agreement with the round top end of the weight. The weight was let to fall on the coated surface from a certain height and it was examined whether the coated surface was damaged or not. The impact strength was expressed in terms of the greatest height (cm) not causing damages on the coated surface.

9. Boiling Water Resistance:

A coated panel was immersed in boiling water for 2 hours. The square-cut peel test was conducted before and after the immersion, and results obtained were compared with each other.

10. Square-Cut Peel Test:

The coating on a coated panel was cross-cut to form 100 cut squares of a side of 1 mm. on the coated surface. The number of squares left unpeeled on the panel surface was counted and the peel strength was expressed in terms of the ratio of the counted number to the total number (100).

Referential Example 1

This Example illustrates the preparation of the copolymer (A).

A mixture of monomers and a polymerization initiator having the following composition:

| | |
|---|---|
| Styrene | 20 parts by weight |
| Methyl methacrylate | 40 parts by weight |
| n-Butyl acrylate | 20 parts by weight |
| Glycidyl methacrylate | 20 parts by weight |
| Azobisisobutyronitrile | 3 parts by weight | was added dropwise to toluene at 110°C. to effect polymerization, so that the final weight ratio of the solvent to the monomer mixture was 1 : 1. The mixture was heated at the above temperature for 5 hours, and the solvent was removed under reduced pressure to obtain a copolymer in a final yield of 95 %.

The weight average molecular weight of the copolymer was 8,600 and the glass transition point was 48°C. was measured by a differential scanning calorimeter.

REFERENTIAL EXAMPLE 2

This Example illustrates the preparation of the compound (B).

A 1 liter-inner capacity glass flask equipped with a stirrer and a condenser was changed with 300 g of p-hydroxybenzoic acid, 500 g of ethylene glycol, 0.5 g of germanium oxide, 0.5 g of calcium acetate and 0.5 g of manganese acetate. The mixture was reacted on an oil bath under reflux of ethylene glycol for 5 hours. The unreacted ethylene glycol was removed at 150°C. under reduced pressure and 200 g of succinic anhydride was added to the residue. Reaction was conducted at 150°C. for 3 hours. Then, 300 g of the reaction mixture was dissolved under heating in 150 g of toluene and 60 g of methylethylketone. The solution was cooled to precipitate crystals of the intended compound of the following formula

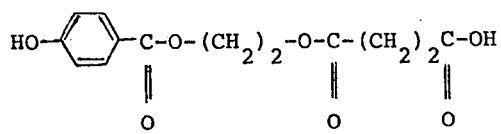

which were found to melt at 122°C.

EXAMPLE 1

A mixture of the following composition was prepared by using the copolymer (A) obtained in Referential Example 1, the compound (B) obtained in Referential Example 2, a pigment and other additives:

| | |
|---|---|
| Copolymer (A) obtained in Referential Example 1 | 50 g. |
| Compound (B) obtained in Referential Example 2 | 10 g. |
| Titanium oxide (R-820 manufactured by Ishihara Sangyo, Japan) | 10 g. |
| Modaflow (flow modifier manufactured by Monsanto Co., USA.) | 1.0 g. |
| Cetyltrimethyl ammonium bromide | 0.5 g. |
| Ionol (antioxidant manufactured by ICIC. I., Great Britain) | 0.15 g. |

The mixture was blended by a Brabender mixer at 100°C. for 7 minutes and pulverized to obtain a powder having a particle size of 200 mesh.

The resulting powder was spray-coated on a zinc phosphatetreated steel plate by an electrostatic powder coater (Stajet JR 50 manufactured by Sames Co.) under coating conditions mentioned below, and the coated powder was immediately baked and cured for 20 minutes in a hot air furnace maintained at 180°C.

| Coating Conditions: | |
|---|---|
| Electric voltage: | 60 KV |
| Electric current: | 75 μA |
| Air pressure for spraying: | 1 Kg/cm² |

For comparison, the following three cross-linking agents were used instead of the compound (B) and the coating was conducted similarly conducted by employing resulting comparative powder paints.

Comparison 1: 6.5 g. of adipic acid (other components were the same as in Example 1)
Comparison 2: 8.0 g. of bisphenol A (other components were the same as in Example 1)
Comparison 3: 5.0 g. of para-hydroxybenzoic acid (other components were the same as in Example 1)

Properties of so obtained coatings were determined to obtain results shown in Table 1.

Table 1

| | Run 1 (Example 1) | Run 2 (Comparison 1) | Run 3 (Comparison 2) | Run 4 (Comparison 3) |
|---|---|---|---|---|
| Curing Agent | | | | |
| Kind | compound (B) obtained in Referential Example 2 | adipic acid | bisphenol A | p-hydroxy-benzoic acid |
| Amount(g) | 10 | 6.5 | 8.0 | 5.0 |
| Test Results | | | | |
| Film thickness (μ) | 70 | 70 | 65 | 70 |
| Color | white | white | light yellow | white |
| Gloss (60° reflection)(%) | 94 | 85 | 82 | 79 |
| Smoothness | good | slightly bad | slightly bad | bad |
| Reflection sharpness (cm) | 27.4 | 17.8 | 15.6 | 12.6 |
| Erichsen value (push-out distance, mm) | 7.9 | 7.6 | 6.1 | 2.3 |
| Du Pont impact value (cm) (½", 500 g) | 40 | 35 | 25 | 25 |
| Storage stability | good | good | bad | good |
| Volatilization weight loss (% by weight) | 0.7 | 2.6 | 1.4 | 1.7 |
| Smell of volatilized gas | no smell | unpleasant smell | slightly unpleasant smell | slightly unpleasant smell |

As is apparent from the results shown in Table 1, the composition of this invention (Example 1) provides a coating having a higher reflection sharpness than coating prepared from comparative compositions (Comparisons 1, 2 and 3), and the coating prepared from the composition of this invention has a well-balanced combination of this excellent reflection sharpness and other physical properties.

The fact that the paint shows a volatilization weight loss at the baking step means that the pain causes a secondary pollution, and generation of an unpleasant smell is detested because the working environment is degraded. In this point, the composition of this invention is excellent and industrially very advantageous.

REFERENTIAL EXAMPLE 3

This Example illustrates the preparation of the copolymer (A).

In the same manner as described in Referential Example 1, a copolymer having the following composition was prepared:

| Styrene | 5 parts by weight |
| Methyl methacrylate | 30 parts by weight |
| Butyl methacrylte | 45 parts by weight |
| Glycidyl methacrylate | 20 parts by weight |
| Azobisisobutyronitrile | 2 parts by weight |

The resulting copolymer was found to have a glass transition point of 54°C. and a weight average molecular weight of 11,500.

REFERENTIAL EXAMPLE 4

This Example illustrates the preparation of the compound (B).

A compound having the following formula

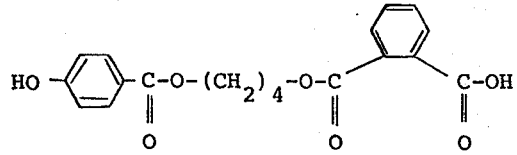

was prepared in the same manner as described in Referential Example 2 except that instead of ethylene glycol and succinic anhydride used in Referential Example 2, equimolar amounts of 1,4-butane diol and phthalic anhydride were used, respectively. The so obtained compound was found to have a melting point of 130°C.

REFERENTIAL EXAMPLE 5

This Example illustrates the preparation of the compound (B).

A compound having the following formula

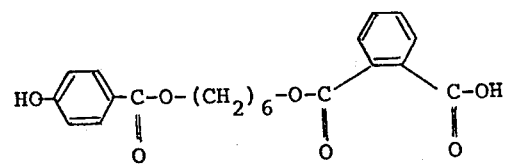

was prepared in the same manner as described in Referential Example 4 except that instead of 1,4-butane diol used in Referential Example 4, 1,6-hexane diol was employed. The so obtained compound was found to have a melting point of 121°C.

EXAMPLE 2

Powder paints were prepared in the same manner as described in Example 1 except that the copolymer obtained in Referential Example 3 was used as the copolymer (A) and the compound prepared in Referential Example 4 or 5 was used as the compound (B). A comparative paint was similarly prepared by using p-hydroxybenzoic acid instead of the compound (B). Each of the so obtained powder paints was coated and baked in the same manner as described in Example 1. Properties of the resulting coatings were tested to obtain results shown in Table 2.

Table 2

| | Run 5 (this invention) | | | Run 6 (this invention) | | Run 7 (comparison) | | |
| --- | --- | --- | --- | --- | --- | --- | --- | --- |
| Curing Agent | | | | | | | | |
| Kind | compound obtained in Referential Example 4 | | | compound obtained in Referential Example 5 | | p-hydroxy-benzoic acid | | |
| Amount (g) | 13.0 | | | 14.2 | | 7.5 | | |
| Test Results | | | | | | | | |
| Film thickness ($\mu$) | 45 | 75 | 100 | 75 | 100 | 45 | 75 | 100 |
| Reflection sharpness (cm) | 24.2 | 26.0 | 26.6 | 25.8 | 26.4 | 9.8 | 11.4 | 12.0 |
| Erichsen value (push-out) (mm) | 8.9 | 7.7 | 7.8 | 8.0 | 8.2 | 6.1 | 2.7 | 0.6 |
| Du Pont impact value (cm) (½", 500 g) | 40 | 40 | 40 | 35 | 40 | 25 | 20 | 10 |
| Boiling water resistance | | | | | | | | |
| square-cut peel test before immersion | 100/100 | 100/100 | 100/100 | 100/100 | 100/100 | 46/100 | 15/100 | 10/100 |
| square-cut peel test after immersion | 100/100 | 100/100 | 94/100 | 100/100 | 96/100 | 0/100 | 0/100 | 0/100 |
| Storage stability | good | | | good | | good | | |
| Volatile weight loss | 0.4 | | | 0.5 | | 2.0 | | |

Table 2-continued

| | Run 5 (this invention) | Run 6 (this invention) | Run 7 (comparison) |
|---|---|---|---|
| (% by weight) | | | |

As is apparent from the results shown in Table 2, compositions of this invention (Runs 5 and 6) provide coatings excellent in the physical properties over the coating prepared from the comparative composition (Run 7), and this tendancy is conspicuous when the coating thickness is large. This characteristic is especially preferred when an anticorrosive coating is prepared.

REFERENTIAL EXAMPLE 6

This Example illustrates the preparation of the copolymer (A).

In the same manner as described in Referential Example 1, a copolymer having the following composition was prepared:

| Styrene | 50 parts by weight |
| Methyl methacrylate | 15 parts by weight |
| Ethyl methacrylate | 5 parts by weight |
| n-Butyl acrylate | 10 parts by weight |
| Glycidyl methacrylate | 20 parts by weight |
| Azobisisobutyronitrile | 2 parts by weight |

The so obtained copolymer was found to have a glass transition point of 59°C. and a weight average molecular weight of 14,700.

REFERENTIAL EXAMPLE 7

This Example illustrates the preparation of the compound (B).

360 parts of methyl p-hydroxyphenylpropionate was reacted with 300 parts of hydroxystearic acid in the presence of 3 parts of dibutyl tin oxide at 150°C. in a nitrogen current for 10 hours. After completion of the reaction, the unreacted excessive methyl p-hydroxyphenylphropionate was distilled at 150°C. under reduced pressure to obtain crude p-hydroxyphenylpropyloxystearic acid. Recrystallization of this crude product from a mixed solvent of methylethylketone and n-hexane gave 350 parts of p-hydroxyphenylpropyloxystearic acid.

REFERENTIAL EXAMPLE 8

This Example illustrates the preparation of the compound (B).

300 parts of p-hydroxybenzoyloxystearic acid was prepared from 304 parts of methyl p-hydroxybenzoate, 300 parts of hydroxystearic acid and 3 parts of dibutyl tin oxide in the same manner as in Referential Example 7.

REFERENTIAL EXAMPLE 9

This Example illustrates the preparation of the compound (B).

1 mole of p-hydroxybenzoic acid was mixed with 2 moles of ε-caprolactone at 150° to 160°C. in a nitrogen current in a separable flask to form a solution. Then, the temperature of the solution was elevated to 180°C. and the solution was heated at this temperature for 5 hours to effect reaction. A minute amount of the unreacted ε-caprolactone was removed under reduced pressure to obtain an intended compound in a yield of 94 %. The product was a white solid and was found to have a melting point of 85°C.

EXAMPLE 3

Powder paints were prepared in the same manner as described in Example 1 except that the copolymer obtained in Referential Example 6 was used as the copolymer and the compound obtained in Referential Example 7, 8 or 9 was used as the compound (B). The so obtained powder paints were coated and baked in the same manner as in Example 1 and the properties of the resulting coatings were tested to obtain results shown in Table 3.

Table 3

| | Run 8 (this invention) | Run 9 (this invention) | Run 10 (this invention) |
|---|---|---|---|
| Curing Agent | | | |
| Kind | compound obtained in Referential Example 7 | compound obtained in Referential Example 8 | compound obtained in Referential Example 9 |
| Amount (g) | 21.1 | 13.7 | 11.5 |
| Test Results | | | |
| Film thickness (μ) | 70 | 75 | 70 |
| Reflection sharpness (cm) | 20.0 | 21.2 | 19.8 |
| Erichsen value (mm) (push-out distance) | 6.3 | 5.7 | 5.2 |
| Du Pont impact value (cm) (½", 500 g) | 30 | 25 | 25 |
| Storage stability | good | good | slightly good |

REFERENTIAL EXAMPLE 10

This example illustrates the preparation of the compound (B).

A 1 liter-inner capacity, two-necked separable flask equipped with a stirrer was charged with 1 mole of dimethyl terephthalate, 1.2 moles of 1,5-pentane diol, 1 mole of ethylene glycol, 0.02 mole of methyl parahydroxybenzoate and 0.15 g of manganese acetate. Nitrogen gas was fed into the flask from one opening at a flow rate of 10 cc/min, and a distillation tube was inserted into the other opening. Ester exchange reaction was conducted on an oil bath maintained at 210°C. while removing methanol by distillation. After completion of the reaction, 0.1 g of antimony trioxide was added to the reaction mixture. One opening of the flask was sealed and the other opening was connected to a vacuum pump. Condensation reaction was condicted under a reduced pressure of 0.5 mm Hg for 5 hours on an oil bath maintained at 220°C. After completion of the reaction, 0.02 mole of phthalic anhydride was added to the reaction mixture and the mixture was held on an oil bath maintained at 220°C. for 2 hours under atmospheric pressure to obtain a polyester which was found to have a number average molecular weight of 9,500 and a melting point of 76°C.

REFERENTIAL EXAMPLE 11

This Example illustrates the preparation of the compound (B).

A 1 liter-inner capacity, two-necked separable flask equipped with a stirrer was charged with 1 mole of dimethyl terephthalate, 1 mole of 1,6-hexane, diol, 1.2 moles of ethylene glycol, 0.04 mole of methyl p-hydroxybenzoate and 0.15 g of manganese acetate. Nitrogen gas was fed into the flask from one opening at a flow rate of 10 ccm/min and a distillation tube was inserted into the other opening. Ester exchange reaction was conducted on an oil bath maintained at 210°C. while removing methanol by distillation. After completion of the reaction, 0.1 g of antimony trioxide was added to the reaction mixture. One opening of the flask was sealed and the other opening was connected to the vacuum pump. Condensation reaction was conducted on an oil bath maintained at 220°C. under a reduced pressure of 0.6 mm Hg for 8 hours. After completion of the reaction, 0.04 mole of sebacic acid was added to the reaction mixture and the mixture was held on an oil bath maintained at 245°C. for 3 hours under atmospheric pressure to obtain a polyester, which was found to have a number average molecular weight of 4,800 and a melting point of 53°C.

REFERENTIAL EXAMPLE 12

This Example illustrates methods for preparing polyester resins which are used in combination with the compound (B) in preferred embodiments of this invention.

Method (A)

A 500 cc-capicity separable flask was charged with 146 g of isophthalic acid, 14.6 g of adipic acid and 180 g of 1,4-butane diol, and they were reacted at 180° to 190°C. in a nitrogen gas current for 5 hours. Water was removed from the reaction mixture and 0.2 g of antimony trioxide as a catalyst was added to the residue. Then the reaction was continued at 200° to 215°C. under a reduced pressure of about 0.2 mm Hg for 3 hours to obtain a polyester resin. Then, about 20 g of β-hydroxyethyl m-hydroxybenzoate was added to the reaction mixture, and the reaction was conducted at 190°C. for 3 hours to obtain a polyester resin having a number average molecular weight of about 4,300 and a melting point of about 105°C.

Method (B)

Polyethylene sebacate was prepared in the same manner as in the above method (A) from 1 mole of sebacic acid and 2 moles of ethylene glycol, and about 13 g of β-hydroxyethyl p-hydroxybenzoate was added to the polyethylene sebacate and the reaction was further continued.

The resulting polyester resin was found to have a number average molecular weight of 6,600 and a melting point of about 70°C.

Method (C)

A separable flask was charged with 125 g of isophthalic acid, 30 g of adipic acid, 70 g of 1,4-butane diol and 50 g of neopentyl glycol, and they were reacted in a nitrogen gas current at 180° to 190°C. for 2 hours. Water was removed from the reaction mixture, and 0.2 g of antimony trioxide as a catalyst was added to the residue and the reaction was further continued for 3 hours at 220°C. under a reduced pressure of about 0.2 mm Hg to obtain a polyester resin.

The resulting polyester was found to have a molecular weight of about 7,300 and a melting point of about 75°C. Calculation from the acid value indicated that one molecule of the polyester contained 0.5 of the carboxyl group on the average.

Method (D)

A separable flask was charged with 0.1 mole of propionic acid, 1.5 moles of ε-caprolactone and 0.1 g of stannous octanoate, and they were reacted in a nitrogen gas current at 160° to 170°C. for 5 hours. A minute amount of the unreacted ε-caprolactone was removed by distillation under reduced pressure to obtain an intended product in a yield of 97 %.

The product was a white solid having a melting point of about 50°C.

Method (E)

3 g of aluminum isopropoxide was added to 100 g of distilled β-propiolactone in a nitrogen gas current and polymerization was conducted at − 10° to 0°C. for 20 hours. The product was dissolved in chloroform, and the solution was poured in ethyl alcohol. The resulting precipitate was dired under reduced pressure to obtain a light yellow polymer in a yield of about 80 %. The polymer was found to have an intrinsic viscosity of about 0.3 and a melting point of 88° to 92°C.

REFERENTIAL EXAMPLE 13

This Example illustrates the preparation of a comparative curing agent which is a carboxyl-terminated polyester.

In the same manner as in the method (A) described in Referential Example 12, a polyester was synthesized from 127 g of bis(hydroxyethyl) terephthalate, 83 g of isophthalic acid and 104 g of neopentyl glycol. Then, 6 g of phthalic acid was added to the product and the reaction was further conducted at about 200°C. in a nitrogen gas current for 3 hours. The resulting polyester resin was found to have an average molecular weight of about 8,500 and a melting point of about 98°C. Calculation from the acid value indicated that one molecule of the polyester contained 2 carboxyl groups on the average.

REFERENTIAL EXAMPLE 14

This Example illustrates the preparation of a comparative curing agent which is a resin having phenolic hydroxyl groups at the terminal ends thereof.

In a 500 ml.-capacity flask, 69 g of bisphenol A was added over a period of 10 minutes to 76 g of an epoxy resin being heated at 150°C. The temperature of the mixture was maintained at 150°C. for 15 hours, and the reaction mixture was cooled to obtain a resin having a molecular weight of 1,500.

REFERENTIAL EXAMPLE 15

This Example illustrates the preparation of the copolymer (A).

In the same manner as described in Referential Example 1, a copolymer having the following composition was prepared:

| | |
|---|---|
| Styrene | 60 parts by weight |
| 2-Ethylhexyl acrylate | 5 parts by weight |
| n-Butyl acrylate | 15 parts by weight |
| Glycidyl methacrylate | 20 parts by weight |
| Azobisisobutyronitrile | 4 parts by weight |

The so obtained copolymer was found to have a glass transition point of 42°C. and a weight average molecular weight of 8,200.

EXAMPLE 4

Powder paints were prepared in the same manner as in Example 1 except that the copolymer prepared in Referential Example 6 was used as the copolymer (A) and the compound prepared in Referential Example 10 or 11 was used as the compound (B). For comparison, powder paints were similarly prepared by using the cross-linking resin prepared in Referential Example 13 or 14 was used instead of the compound (B). These powder paints were coated and baked in the same manner as in Example 1, and properties of the resulting coatings were tested to obtain results shown in Table 4.

Table 4

| | Run 11 (this invention) | Run 12 (this invention) | Run 13 (comparison) | Run 14 (comparison) |
|---|---|---|---|---|
| Curing Agent | | | | |
| Kind | compound obtained in Referential Example 10 | compound obtained in Referential Example 11 | compound obtained in Referential Example 13 | compound obtained in Referential Example 14 |
| Amount (g) | 24.2 | 31.4 | 25.1 | 23.2 |
| Test Results | | | | |
| Film thickness ($\mu$) | 70 | 70 | 75 | 70 |
| Reflection sharpness (cm) | 18.6 | 19.8 | 9.0 | 10.4 |
| Erichsen value (mm) (push-Out distance) | 6.0 | 5.7 | 5.4 | 4.1 |
| Du Pont impact value (cm) (½", 500 g) | 30 | 30 | 25 | 20 |
| Storage stability | good | good | good | bad |

From the results shown in Table 4, it will readily be understood that the compositions of this invention (Runs 11 and 12) are much excellent over the comparative compositions (Runs 13 and 14) with respect to the reflection sharpness of the resulting coating.

EXAMPLE 5

In the same manner as described in Example 1, powder paints were prepared by using the copolymer obtained in Referential Example 15 as the copolymer (A) and the compound obtained in Referential Example 4 as the compound (B) with or without the polyester resin prepared according to the method (A), (D) or (E) described in Referential Example 12. The powder paints were coated and baked in the same manner as described in Example 1 and properties of the resulting coatings were tested to obtain results shown in Table 5.

Table 5

| | Run 15 (this invention) | Run 16 (this invention) | Run 17 (this invention) | Run 18 (this invention) |
|---|---|---|---|---|
| Compound (B) | Referential Example 4 | Referential Example 4 | Referential Example 4 | Referential Example 4 |
| Amount (g) of Compound (B) | 4.5 | 11.0 | 7.3 | 7.3 |
| Resin of Referential Example 12 | method (A) | method (D) | method (E) | — |
| Amount (g) of Resin of Referential Example 12 | 10.1 | 4.2 | 5.0 | — |
| Test Results | | | | |
| Film thickness ($\mu$) | 70 | 70 | 65 | 70 |
| Reflection sharpness (cm) | 24.0 | 25.4 | 23.2 | 21.8 |
| Erichsen value (mm) (push-out distance) | 7.0 | 7.2 | 7.8 | 4.2 |
| Du Pont impact value (cm) (½", 500 g) | 30 | 40 | 30 | 25 |
| Storage stability | good | good | good | good |

EXAMPLE 6

In the same manner as described in Example 1, powder paints were prepared by using the copolymer obtained in Referential Example 15 as the copolymer (A) and components indicated in Table 6. The so prepared powder paints were coated and baked in the same manner as described in Example 1, and properties of the resulting coatings were tested to obtain results shown in Table 6.

In Runs 19 and 21, para-hydroxybenzoic acid, the compound (B) and the polyester of Referential Example 12 were melt-blended in advance at 180°C. for 3 minutes. The molten mixture was then added to the copolymer (A) and other additives as described in Example 1.

Table 6

| | Run 19 (this invention) | Run 20 (this invention) | Run 21 (comparison) | Run 22 (this invention) | Run 23 (comparison) | Run 24 (this invention) | Run 25 (comparison) |
|---|---|---|---|---|---|---|---|
| Compound (B) | Referential Example 10 | Referential Example 10 | — | Referential Example 4 | — | Referential Example 5 | — |
| Amount (g) of Compound (B) | 4.0 | 10.8 | — | 7.8 | — | 5.3 | — |
| Cross-linking Compound | p-hydroxybenzoic acid | p-hydroxybenxoic acid | p-hydroxybenxoic acid | sebacic acid | DPPO* | bisphenol A | bisphenol A |
| Amount (g) of Cross-linking Compound | 5.5 | 5.5 | 5.5 | 3.7 | 16.1 | 7.5 | 7.5 |
| Polyester of Referential Example 12 | method (B) | — | — | — | — | method (C) | — |
| Amount (g) of Polyester | 5.3 | — | — | — | — | 6.1 | — |
| Test Results | | | | | | | |
| Film thickness (μ) | 75 | 70 | 70 | 70 | 70 | 60 | 65 |
| Reflection sharpness(cm) | 25.6 | 19.0 | 10.6 | 20.3 | 13.5 | 23.8 | 14.4 |
| Erichsen value (mm) (push-out distance) | 8.3 | 6.8 | 1.1 | 7.4 | 3.5 | 7.7 | 3.0 |
| Du Pont impact value (cm) (½'', 500 g) | 45 | 35 | 20 | 35 | 20 | 40 | 20 |
| Storage stability | good | good | good | good | bad | good | bad |
| Volatilization weight loss (% by weight) | 0.9 | 1.2 | 1.5 | 0.7 | 1.5 | 0.8 | 1.3 |

*DPPO: 4,4'-(bishydroxyphenyl) octanoic acid

From the results shown in Table 6, it will readily be understood that the compositions of this invention (Runs 19, 20, 22 and 24) are highly improved over comparative compositions (Runs 21, 23 and 25) with respect to the balance among the reflection sharpness and other properties, and that the effects of this invention are much enhanced by incorporation of the polyester resin as described in Referential Example 12.

What is claimed is:

1. A powder coating composition which comprises (A) 100 parts by weight of a copolymer obtained by copolymerizing 5 to 30 % by weight of a compound represented by the general formula $$CH_2=C(R_1)-COOCH_2-C(R_2)-CH_2 \atop \diagdown O \diagup$$

wherein $R_1$ and $R_2$ stand for a hydrogen atom or a methyl group,
with 95 to 70 % by weight of a vinyl compound other than said compound, said copolymer having a glass transition point of 30° to 90°C. and a weight average molecular weight of 2,500 to 30,000, and (B) 3 to 70 parts by weight of a compound containing in the molecule one phenolic hydroxyl group and one carboxyl group and further containing at least one ester linkage between the benzene nucleus to which said phenolic hydroxyl group is bonded and said carboxyl group, said compound (B) having a melting point of 45° to 160°C. and a number average molecular weight of up to 10,000.

2. A powder coating composition according to claim 1 wherein the compound (B) is at least one member selected from the group consisting of compounds represented by the general formula $$HO-\langle C_6H_4 \rangle-C(=O)-O-R_3-O-C(=O)-R_4-C(=O)-OH$$

wherein $R_3$ stands for an alkylene, cycloalkylene or polyoxyalkylene group having 2 to 10 carbon atoms, and $R_4$ stands for an arylene, alkylene or cycloalkylene group having 2 to 10 carbon atoms.

3. A powder coating composition according to claim 1 wherein the compound (B) is at least a member selected from the group consisting of compounds represented by the general formula $$HO-\langle C_6H_4 \rangle-C(=O)-O-(R_5-C(=O)-O)_n-H$$

wherein $R_5$ stands for an alkylene group having 1 to 20 carbon atoms and $n$ is an integer of at least 1.

4. A powder coating composition according to claim 1 wherein the compound (B) is at least a member selected from the group consisting of compounds represented by the general formula $$HO-\langle C_6H_4 \rangle-R_8-COO-R_9-COOH$$

wherein $R_8$ stands for an alkylene or arylene group having 1 to 10 carbon atoms and $R_9$ stands for an alkylene, arylene and cycloalkylene group having 1 to 20 carbon atoms.

5. A powder coating composition according to claim 1 which further comprises (C) 3 to 40 parts by weight of at least one member selected from the group consisting of (i) polybasic carboxylic acids, (ii) polyhydric phenols and (iii) compounds containing in the molecule at least one phenolic hydroxyl group and at least one carboxyl group other than said compound (B), said compound (i), (ii) and (iii) each having a molecular weight of 130 to 500.

6. A powder coating composition according to claim 1 which further comprises (D) 5 to 40 parts by weight of a polyester resin other than the compound (B), said polyester having a melting point of 40° to 160°C. and a number average molecular weight of 1,000 to 10,000.

7. A powder coating composition according to claim 5 wherein the compound (C) is hydroxybenzoic acid.

* * * * *

UNITED STATES PATENT OFFICE
CERTIFICATE OF CORRECTION

Patent No. 3,978,153  Dated August 31, 1976

Inventor(s) MIKIO SATO ET AL

It is certified that error appears in the above-identified patent and that said Letters Patent are hereby corrected as shown below:

Col. 2, line 65, change "a vinyl compound" to --vinyl compounds--.

Col. 5, line 68, change "a vinyl monomer" to --vinyl monomers--.

Col. 6, line 16, after "vinyl" change "monomer" to --monomers--

Col. 6, line 17, after "which" change "is" to --are--.

Col. 10, line 3, change "polybaric" to --polybasic--.

Col. 19, line 13, change "tendancy" to --tendency--.

Col. 21, line 10, change "condicted" to --conducted--.

Col. 22, line 47, change "dired" to --dried--.

Col. 23, Table 4 at the left-hand column, change "(push-Out distance)" to --(push-out distance)--.

Claim 1 at col. 25, line 55, change "a vinyl compound" to --vinyl compounds--.

Signed and Sealed this

Eighteenth Day of January 1977

[SEAL]

Attest:

RUTH C. MASON
Attesting Officer

C. MARSHALL DANN
Commissioner of Patents and Trademarks